(12) United States Patent
Bloom et al.

(10) Patent No.: US 7,496,291 B2
(45) Date of Patent: Feb. 24, 2009

(54) METHOD AND APPARATUS FOR INTERLEAVED IMAGE CAPTURES

(75) Inventors: Daniel M. Bloom, Fort Collins, CO (US); Gregory V. Hofer, Fort Collins, CO (US); Jennifer J. Thayer, Fort Collins, CO (US); Mark John Bianchi, Fort Collins, CO (US); Jason E. Yost, Fort Collins, CO (US); Scott A. Woods, Fort Collins, CO (US); Oscar R Herrera E., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 414 days.

(21) Appl. No.: 11/386,520

(22) Filed: Mar. 21, 2006

(65) Prior Publication Data

US 2007/0223904 A1    Sep. 27, 2007

(51) Int. Cl.
*G03B 7/093* (2006.01)
(52) U.S. Cl. .................. 396/246; 348/296; 348/362
(58) Field of Classification Search ............ 396/96, 396/100, 246, 250, 322, 332, 333, 335; 348/223.1, 348/229.1, 296, 362
See application file for complete search history.

(56) References Cited

U.S. PATENT DOCUMENTS

| | | | |
|---|---|---|---|
| 5,420,635 | A | 5/1995 | Konishi et al. |
| 6,628,328 | B1* | 9/2003 | Yokouchi et al. ......... 348/221.1 |
| 6,812,963 | B1 | 11/2004 | Herrera E. |
| 6,970,195 | B1* | 11/2005 | Bidermann et al. ......... 348/308 |
| 7,202,897 | B2* | 4/2007 | Suzuki ....................... 348/296 |
| 2001/0030708 | A1* | 10/2001 | Ide et al. ..................... 348/362 |
| 2003/0151689 | A1 | 8/2003 | Murphy |
| 2005/0046720 | A1 | 3/2005 | Bean et al. |
| 2005/0046723 | A1 | 3/2005 | Bean et al. |
| 2005/0157198 | A1 | 7/2005 | Larner et al. |
| 2006/0012689 | A1* | 1/2006 | Dalton et al. ............ 348/224.1 |
| 2006/0170780 | A1 | 8/2006 | Turley et al. |
| 2006/0170790 | A1* | 8/2006 | Turley et al. ............. 348/229.1 |

OTHER PUBLICATIONS

Sony ICX282AK, "Diagonal 11mm(Type 2/3)Frame Readout CCD Image Sensor With Square Pixel for Color Cameras" pp. 1-48, date unknown.
Sony ICX495AQF, Diagonal 7.19mm(Type1/2.5)Frame Readout CCD Image Sensor with a Square Pixel For Color Cameras, Preliminary, pp. 1-18, date unknown.
Panasonic, Document No. MN39482, "Targeted Specificatin", pp. 15, date unknown.
Industrial Monochrome CCD Camera, CV-M300, Operational Manual, JAI, www.jai.com., Rev.E, pp. 24, date unknown.

* cited by examiner

*Primary Examiner*—W. B. Perkey (57) ABSTRACT

A digital camera takes interleaved photographs of two different kinds. In one example embodiment, the first kind of photograph is taken using a first set of pixels of the camera's electronic array light sensor and has a short exposure time. The second kind of photograph is taken using a second set of pixels and has a long exposure time. More than one of the short-exposure-time photographs is taken while each long-exposure-time photograph is exposed. The two kinds of photographs are used for different purposes. For example, one kind may be used for performing automatic focusing while the other kind is used for displaying in a live view display. In this way, live view may continue while automatic focusing is performed. In another embodiment, one kind of photograph is used for providing a live view display, and the other is used in selecting exposure settings for a final photograph.

23 Claims, 7 Drawing Sheets

METHOD AND APPARATUS FOR INTERLEAVED IMAGE CAPTURES

FIELD OF THE INVENTION

The present invention relates to digital photography.

BACKGROUND OF THE INVENTION

In a typical digital camera, a lens projects an image of a scene onto an electronic array light sensor. The sensor and associated electronics read the impinging light, and construct an array of numerical values representing the brightness, color, or both of scene locations. This array of numerical values may be called a digital photograph, a digital image, or simply an image or photograph.

While a camera user is composing a photograph, the camera may take many preliminary photographs in preparation for taking a "final" photograph. For the purposes of this disclosure, a "final" photograph is the photograph the photographer intends to take and store for later use. At least some of the preliminary photographs may be used for gathering information about the scene so that the camera may be configured properly for taking the final photograph. For example, some of the preliminary photographs may be analyzed to determine the brightness of the scene so that exposure parameters, such as a lens aperture and exposure time, may be set for taking the final photograph. The distribution of colors in some of the preliminary photographs may be examined to determine what kind of white balance adjustment should be applied to the final photograph.

Some of the preliminary photographs may be displayed on an electronic display on the camera so that the user can see an approximation of what the final photograph may look like. When sequential preliminary photographs are shown on the display, the resulting "live view" aids the photographer in composing the final photograph. In some digital cameras, this live view is the only means the photographer has for composing a photograph, as some digital cameras do not provide an optical viewfinder.

Some of the preliminary photographs may be used for focusing the camera's lens. Generally, focus is adjusted by moving one or more lens elements, and the quality of focus at a particular focus setting is evaluated by computing a spatial contrast metric for a photograph taken at that focus setting. Focusing may be accomplished by computing the spatial contrast metric for photographs taken at more than one trial focus settings, and then adjusting the focus position based on the computed metrics until focus is optimized. The process may be iterative and may require the taking of several trial photographs. Some cameras, for example digital single lens reflex (SLR) cameras, may have a separate sensor dedicated to focusing so that the main electronic array light sensor can be used for taking live view preliminary photographs without interruption during focusing. However, this additional sensor adds cost and complexity to the camera. It is desirable to use a single electronic array light sensor for both live view and for focusing, and for other functions the camera performs.

These many different uses for preliminary photographs have divergent requirements. It is desirable that photographs shown on the display during live view be of good quality, with little noise and accurate colors. This may require that a photograph taken for live view have a relatively long exposure time, especially when the scene is dimly lit. However, photographs used for automatic focusing should have relatively short exposure times so that subject motion has minimal effect on the spatial contrast analysis, and so that focusing can be accomplished rapidly.

Because these requirements conflict, previous cameras have simply suspended the live view during automatic focusing. This may be disconcerting for a photographer who depends on the live view for composition. Furthermore, because continuous focusing and live view have been incompatible, many consumer digital cameras are inconvenient for photographing rapidly changing scenes such as sporting events.

DETAILED DESCRIPTION

Figure 1:
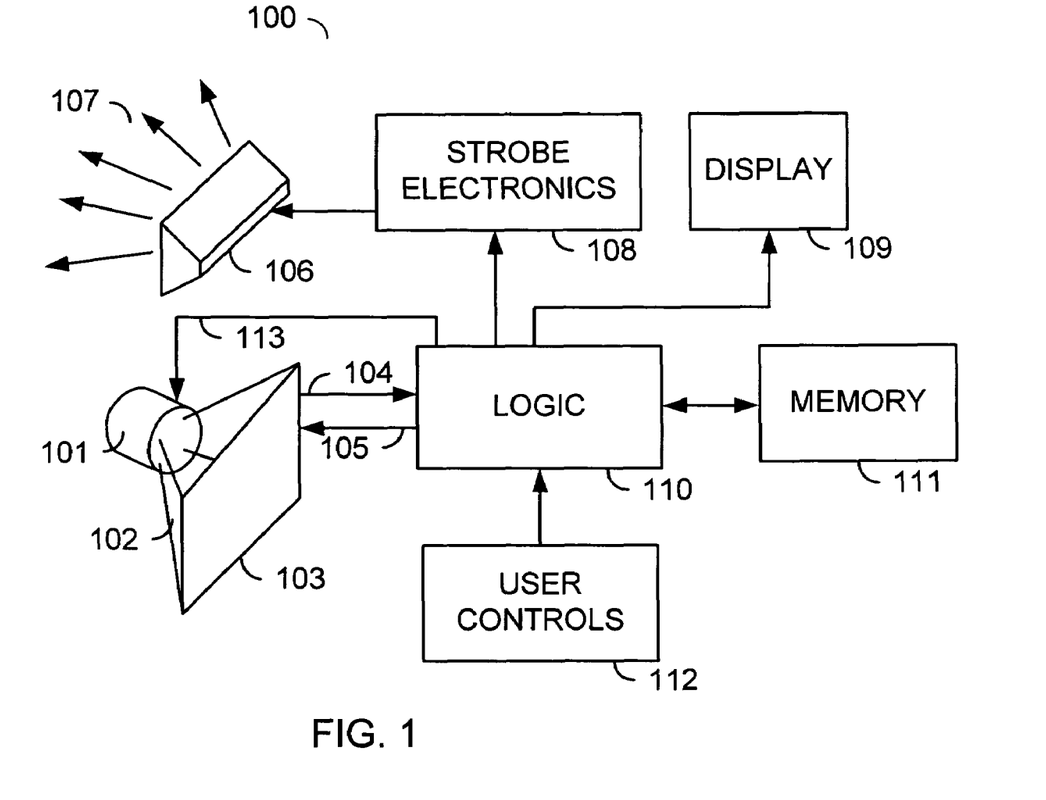
FIG. 1 shows a simplified block diagram of a digital camera in accordance with an example embodiment of the invention.

FIG. 1 shows a simplified block diagram of a digital camera 100 in accordance with an example embodiment of the invention. Lens 101 gathers light emanating from a scene, and redirects the light 102 to an electronic array light sensor 103. Sensor 103 comprises an array of light-sensitive elements, often called pixels. Each pixel on array 103 corresponds to a particular scene location by virtue of the operation of lens 101. A common type of electronic array light sensor generates, at each pixel, electric charge at a rate proportional to the intensity of light falling on the pixel, and stores these charges in charge coupled devices (CCDs). Such a sensor is often called a "CCD sensor", or simply a "CCD". Other kinds of sensors may be used as well, for example an active pixel complementary metal oxide semiconductor (CMOS) sensor. In many cameras, each sensor pixel also comprises a color filter so that color information about the scene is obtained. One of skill in the art will recognize that at least some aspects of the invention may be embodied in a camera with color capability or one without. Sensor 103 communicates image data signals 104 to logic 110. Logic 110 may comprise an analog to digital converter, a microprocessor or digital signal processor, or other kinds of circuitry, or any of these in any combination.

Logic 110 converts image data signals 104 to digital values representing the light intensities measured at the sensor pixel sites. An ordered array of these digital values, each representing the brightness, color, or both of a particular scene location, may be called a digital image, a digital photograph, or simply an image or a photograph. The digital values corresponding to pixel locations on sensor 103 may be called "pixel values". When a digital image is properly interpreted and displayed, a representation of the original scene can be reproduced from the digital image.

Logic 110 may also perform other functions, such as generally controlling the operation of camera 100, controlling sensor 103 through control signals 105, interacting with a user of the camera through display 109 and user controls 112, processing digital images, and transmitting digital images to other equipment for processing, display, or printing. Logic 110 may perform automatic focusing by sending lens control signals 113 to lens 101.

A flash or strobe unit 106 may provide supplemental light 107 to the scene under the control of strobe electronics 108, which are in turn controlled by logic 110. Memory 111 provides storage for digital images captured by the camera, as well as for camera configuration information, for program instructions for logic 110, and for other items. Memory 111 may comprise non-volatile memory (such as flash memory), random access memory (RAM), read only memory (ROM), or any combination of these and other kinds of memory. User controls 112 may comprise buttons, dials, switches, or other devices by which a user controls operation of camera 100.

Figures 2A, 2B:
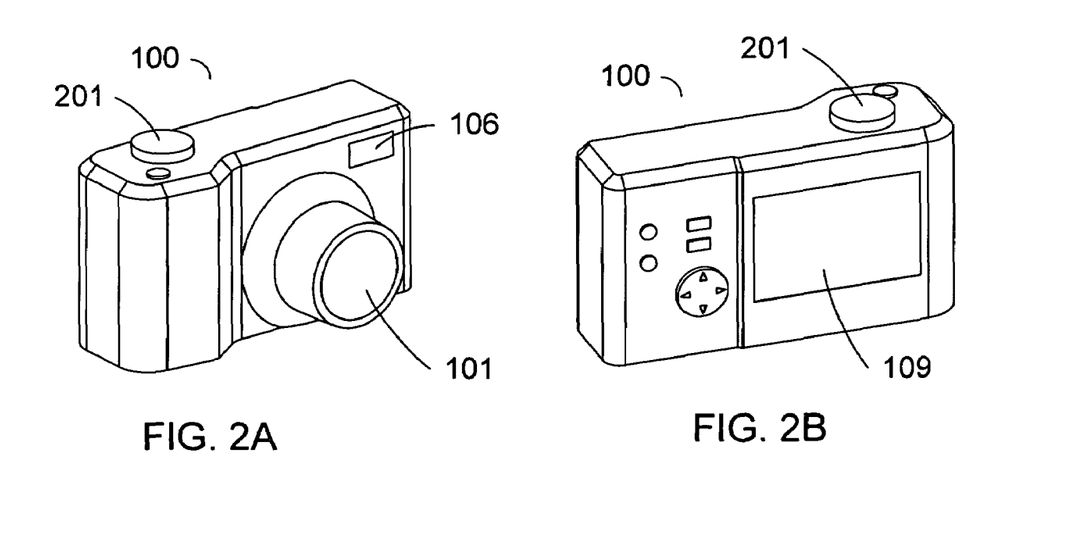
FIGS. 2A and 2B show front and rear perspective views respectively of the camera of FIG. 1.

FIGS. 2A and 2B show front and rear perspective views respectively of camera 100. Lens 101 is visible in FIG. 2A, and display 109 is visible in FIG. 2B. Also visible is a user control of particular interest. Shutter release 201 (one of user controls 112) is the control the user depresses in order to cause a photograph to be taken. This control is called a "shutter release" for historical reasons, even if camera 100 does not comprise an actual mechanical shutter. Shutter release 201 may cause camera 100 to enter two successive states, called S1 and S2. The S1 state occurs when the shutter release is partially depressed, and the S2 state occurs when the shutter release is fully depressed. At S1, the camera may perform automatic focusing and exposure determination. At S2, a "final" photograph is actually taken and stored in memory 111.

Figure 3:
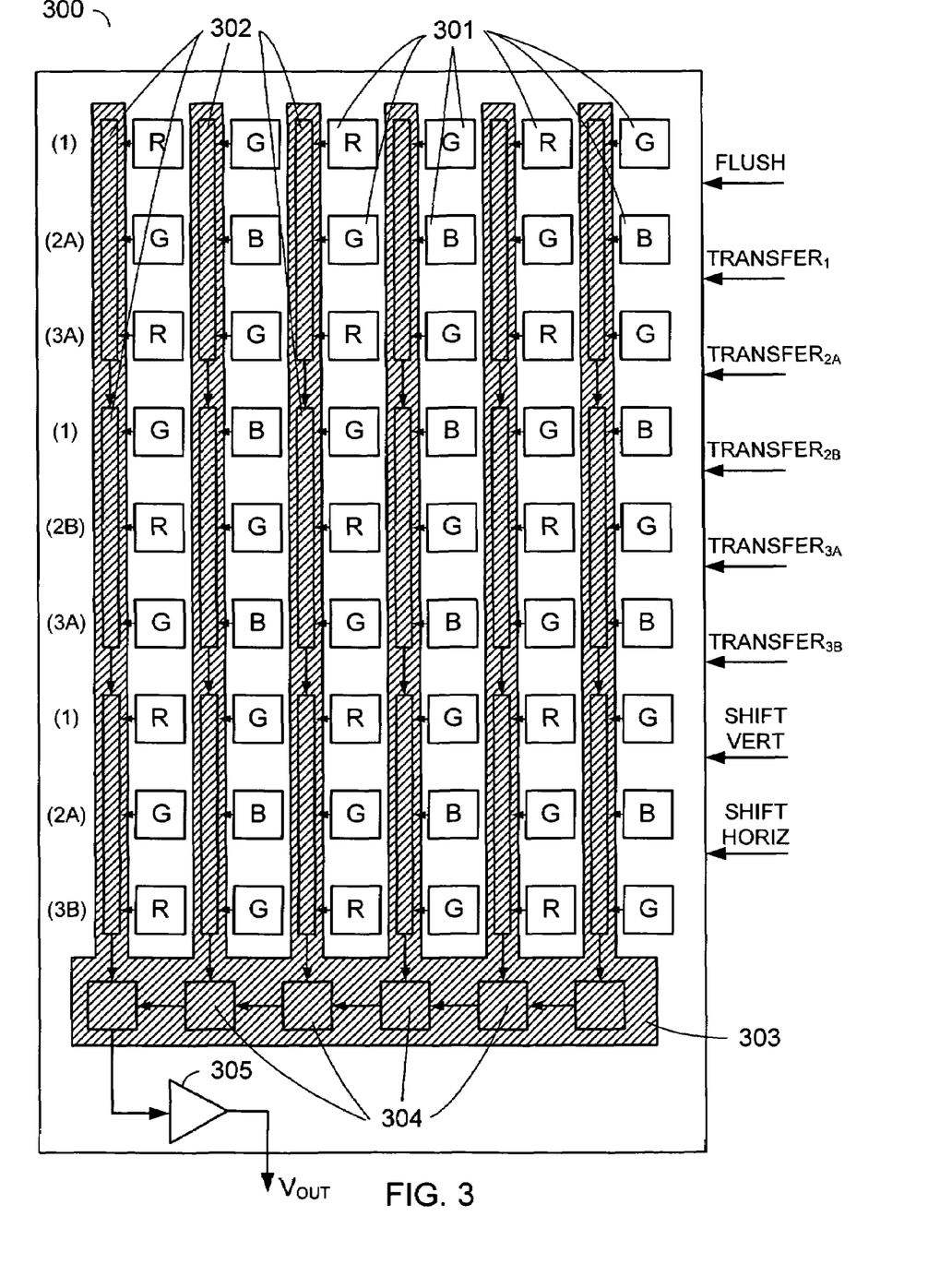
FIG. 3 shows a simplified schematic diagram of a three-field CCD sensor, in accordance with an example embodiment of the invention.

FIG. 3 shows a simplified schematic diagram of an example three-field CCD sensor 300 usable in an example embodiment of the invention. Example sensor 300 is representative of commercially-available CCD sensors. The invention may be embodied using a CCD sensor such as sensor 300 or using a CMOS sensor. Sensor 300 comprises nine rows, each row comprising six pixels 301. An actual sensor may have many more pixels, even millions or tens of millions, in which the 6×9 pixel pattern of FIG. 3, and its complement wherein the top row has pixels with blue and green filters, may be repeated many times. Example sensor 300 is shown with only a few pixels for clarity of explanation and ease of drawing. Sensor 300 is not shown to scale. Each of pixels 301 is an area of semiconductor material having the property that electric charge accumulates in the pixel at a rate proportional to the intensity of light falling on the pixel. In example sensor 300, each pixel is fitted with a color filter, either red, green, or blue, in the familiar Bayer pattern, so that each pixel responds primarily to a subset of the visible spectrum. Other kinds and arrangements of filters may be used.

Adjacent the columns of pixels are vertical shift registers 302. Vertical shift registers 302 are constructed similarly to pixels 301 and can also hold electric charge, but are shielded from incident light by shielding material 303. Example sensor 300 is a "three-field" CCD, in that each vertical shift register serves three pixels.

A capture of a complete full-resolution final photograph using sensor 300 may proceed as follows. The pixels 301 are emptied of charge by diverting their contents to the substrate of sensor 300. This is sometimes called a "flush" operation, and occurs in response to the FLUSH signal. Pixels 301 are then exposed to light from a scene for a fixed period of time. Preferably, for a final photograph, the exposure is halted at the end of the exposure time by closing a mechanical shutter, blocking any further light from reaching pixels 301. The contents of the pixels in field (1) are then transferred into vertical shift registers 302 by adjusting the electric potentials of the pixels 301 and shift registers 302, in response to the $TRANSFER_1$ signal, so that the charge migrates into the shift registers. (One of skill in the art will recognize that the TRANSFER and SHIFT signals of FIG. 3 are conceptual and simplified. Each shift or transfer may actually be accomplished by sequentially adjusting the voltages of a set of signals.) The contents of vertical shift registers 302 are then shifted row-by-row, in response to the SHIFT VERT signal, into horizontal shift registers 304. Between vertical shifts, the contents of the horizontal shift registers 304 are shifted pixel-by-pixel in response to the SHIFT HORIZ signal to output stage 305. For each horizontal shift, voltage $V_{OUT}$ momentarily reflects the amount of charge that reached output stage 305 with the most recent shift, and therefore also indicates the amount of light that fell on the corresponding pixel during the exposure time. The voltage may be converted to a numerical value using an analog-to-digital converter (not shown) and the numerical value stored.

When all of the charges from field (1) have been processed, the contents of the pixels in the second field, comprising the rows marked (2A) and (2B), are transferred into vertical shift registers using signals $TRANSFER_{2A}$ and $TRANSFER_{2B}$. The charges are then sequentially shifted into horizontal shift registers 304, through output stage 305, and are converted and the resulting numerical values stored. The contents of the pixels in the third field, comprising the rows marked (3A) and (3B) are processed similarly, and the resulting numerical values from the three fields are combined to form a digital photograph.

While the process just described results in a full-resolution color image, and illustrates the basic operation of sensor 300, many other ways of controlling sensor 300 are possible. For example, not all pixel charges need be read out of sensor 300 for a particular exposure. All of the charges from field (1) could be read out and converted, and the remaining charges simply flushed. The resulting numerical array could be used to construct a photograph of less than full resolution. For the purposes of this disclosure, "resolution" refers to the number of pixels used to represent a certain field of view. A high-resolution photograph uses a large number of pixels to represent a particular field of view, and a low-resolution photograph uses a smaller number of pixels to represent the same field of view. A low-resolution photograph may be made from a high-resolution photograph by decimation or by combining pixels, either in the charge domain or digitally after conversion to numerical values.

In another example, charges from more than one pixel may be combined in a shift register using the process of "binning". For example, pixels from more than one field may be transferred into vertical shift registers 302 at the same time. This is called "vertical binning". In another example of vertical binning, the contents of more than one vertical shift register 302 may be shifted into a horizontal shift register 304 before the charges in the horizontal shift registers 304 are shifted to output stage 305. "Horizontal binning" is also possible. For example, charges from more than one horizontal shift register 304 may be shifted into output stage 305 before conversion.

Binning results in a photograph having less than full resolution, and allows charges to be shifted out of sensor 300 rapidly so that a low-resolution photograph may be taken more rapidly than a full resolution photograph. Care is generally taken so that none of the pixels or shift registers accumulates enough charge to overflow, or "saturate", either due to excessive exposure time or because charges from multiple pixel sites are combined. Charges from pixels having unlike color filters may be binned in some cases, or charges from pixels having only like colors may be binned, or some binning may combine charges from unlike-color pixels while some combines charges from only like-color pixels. This latter technique is facilitated by the design of sensor 300, wherein fields (2) and (3) are further subdivided into subfields (2A) and (3A) and subfields (3A) and (3B) respectively. The subfields can be transferred into vertical shift registers 302 independently, using signals $TRANSFER_{2A}$, $TRANSFER_{2B}$, $TRANSFER_{3A}$, and $TRANSFER_{3B}$.

In accordance with an example embodiment of the invention, a camera uses these features of sensor 300 to take at least two interleaved kinds of periodic photographs while the sensor is continually exposed to light. The first kind of photograph has a relatively short exposure time and is taken using a first set of pixels of an electronic array light sensor comprised in the camera. The second kind of photograph has a relatively long exposure time and is taken using a second set of pixels of the electronic array light sensor. More than one photograph of the short-exposure first kind may be taken for each photograph of the long-exposure second kind. Preferably, the camera uses the photographs with relatively short exposure times to accomplish automatic focusing, and uses the photographs with relatively long exposure times in a live view display, sequentially displaying photographs in the display while automatic focusing is being performed. In this way, live view can continue during automatic focusing, and photography of rapidly changing scenes is facilitated. Binning may be employed so that each photograph is well exposed. The two kinds of photographs need not be of the same resolution, nor have the same color characteristics. Other uses of the two kinds of photographs are possible as well.

Figure 4:
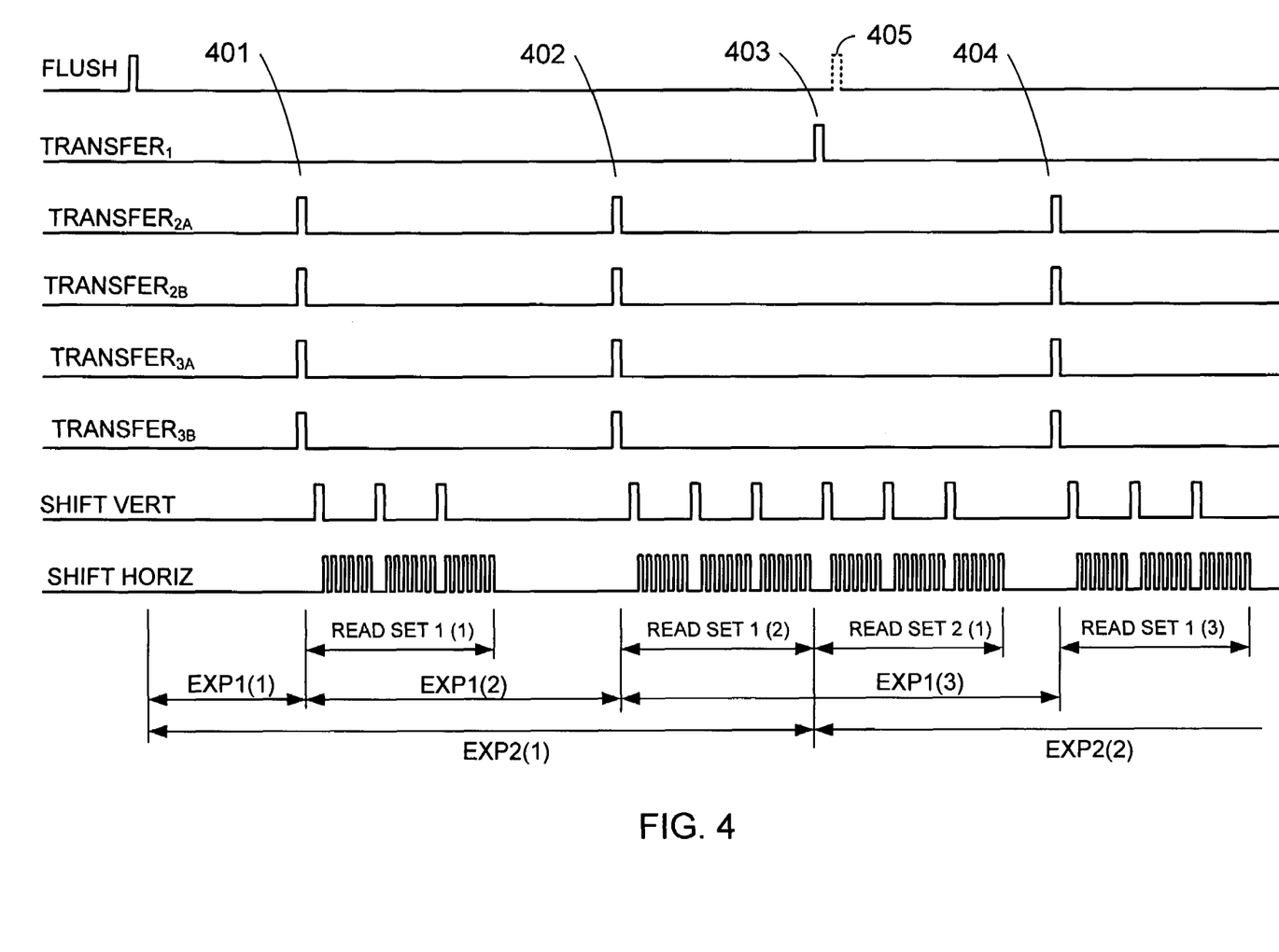
FIG. 4 shows a timing diagram that illustrates how the sensor of FIG. 3 may be controlled in a simple example embodiment of the invention.

FIG. 4 shows a timing diagram that illustrates how sensor 300 may be controlled in a simple example embodiment of the invention. In this example, the first set of pixels, used to take periodic photographs with a relatively short exposure time, comprises both fields (2) and (3). The second set of pixels, used to take periodic photographs with a relatively long exposure time, is simply field (1). Logic 110 supplies control signals to example sensor 300 as follows.

Sensor 300 is exposed to light from the camera lens throughout the following sequences. No mechanical shutter is used during the taking of preliminary photographs; rather, all-electronic control of sensor 300 is used. First, the FLUSH signal is asserted, causing all of the pixels to be emptied of charge. After a time EXP1, at time 401, all of the charges from pixels in fields (2) and (3) are transferred into vertical shift registers 302. This operation causes binning of the charges in fields (2) and (3), and the binning combines charges from pixels of unlike colors. The transfer operation empties the charges from the pixels in fields (2) and (3), effectively flushing the pixels in those fields. Because sensor 300 is still exposed to light, the pixels in fields (2) and (3) immediately begin accumulating new charges.

Once the charges from fields (2) and (3) have been transferred into shift registers 302, the charges are shifted out of sensor 300 row-by-row and pixel-by-pixel, using three assertions of SHIFT VERT and six assertions of SHIFT HORIZ for each assertion of SHIFT VERT. The resulting digital photograph, derived from the pixels in fields (2) and (3), is therefore taken with the relatively short exposure time EXP1.

At time 402, exposure time EXP1 has once again elapsed. A second photograph, having the relatively short exposure time EXP1, is read from sensor 300 by once again transferring the charges in fields (2) and (3) into the vertical shift registers and out of sensor 300 using three assertions of SHIFT VERT and 18 assertions of SHIFT HORIZ. The pixels in fields (2) and (3) then immediately begin accumulating new charges. Note that FIG. 4 is not to scale, and that the short-exposure-time photographs from fields (2) and (3) can occur at regular intervals.

At time 403, shortly after the second image has been read from the pixels of fields (2) and (3), the charges that have been accumulating in the pixels in field (1) are transferred into vertical shift registers 302 and then read out of sensor 300. (The pixels in field (1) then begin accumulating new charges.) The resulting digital photograph, derived from the pixels in field (1), is therefore taken with the relatively long exposure time EXP2. In fact, in this example, time EXP2 is just more than twice time EXP1, and subsequent photographs taken from the second set of pixels will occur at an interval that is twice EXP1. The process then repeats. At time 404, another photograph with exposure time EXP1 is read from fields (2) and (3), and after time EXP1 has elapsed again photographs are read from fields (2) and (3) and from field (1).

This process may repeat many times. For example, camera 100 may provide a "tracking focus" mode, wherein, as long as shutter release 201 is held at the S1 position, the camera continually re-evaluates and adjusts focus while also maintaining a live view display that allows the photographer to continually refine composition. When shutter release 201 is further pressed to the S2 position, camera 100 could take a final photograph with minimal delay because focusing and other adjustments are already complete.

Because no binning of charges from pixels of unlike colors has occurred in the taking of the long-exposure-time image, this image is suitable for uses in which color is important. For example, this photograph may be displayed in a live view sequence, or analyzed to determine the proper white balance adjustment for the upcoming final photograph. (Other adjustments may be performed, such as scaling the photograph to fit screen 109.) During the taking of the short-exposure-time images derived from fields (2) and (3), charges from pixels of unlike colors are binned, so that the resulting images are not full color. However, they retain enough spatial contrast, especially in the horizontal direction, to allow effective evaluation of focus quality. Also, because two charges are binned to form each element of the short-exposure-time images, these exposures use generally the same portion of the charge capacity of the vertical and horizontal shift registers 302 and 304 as do the long-duration exposures of field (1). Assuming exposure times EXP1 and EXP2 are properly chosen for the scene lighting conditions, saturation is substantially avoided. (So choosing exposure times is well known in the art.)

The time required to read an image from sensor 300 depends on several factors, including how much binning is performed and whether some charges are discarded without conversion to numerical values. The exposure time for a photograph depends on the scene lighting and many other factors, including but not limited to the lens aperture, motion blur restrictions, analog and digital gain applied to the image data signals, and whether binning is performed during the readout of the photograph. If the readout time is smaller than the exposure time, the camera is said to be "exposure limited". That is, the frequency at which sequential photographs can be taken is limited by the time required to expose each photograph. If the readout time is larger than the exposure time, the camera is said to be "readout limited". In FIG. 4, camera 100 is exposure limited. Each exposure time EXP1 and EXP2 is longer than the time required to read the images from sensor 300.

If, due to lighting conditions or other factors, the time required to read both images becomes larger than EXP1, it will not be possible, in the example of FIG. 4, to read image from both the first set of pixels and the second set of pixels in the time between times 402 and 404. Optionally, the FLUSH signal may be reasserted, indicated by dashed lines at time 405 just after time 403, so that all photographs taken from the first set of pixels have exposure time EXP1, even though they are not taken at perfectly regular intervals. (If the FLUSH signal is asserted at time 405, the exposures for both sets of pixels are restarted, but this restart is not shown in FIG. 4.) In that case, the exposure time for the second set of pixels, EXP2, is slightly longer than twice EXP1.

Figure 5:
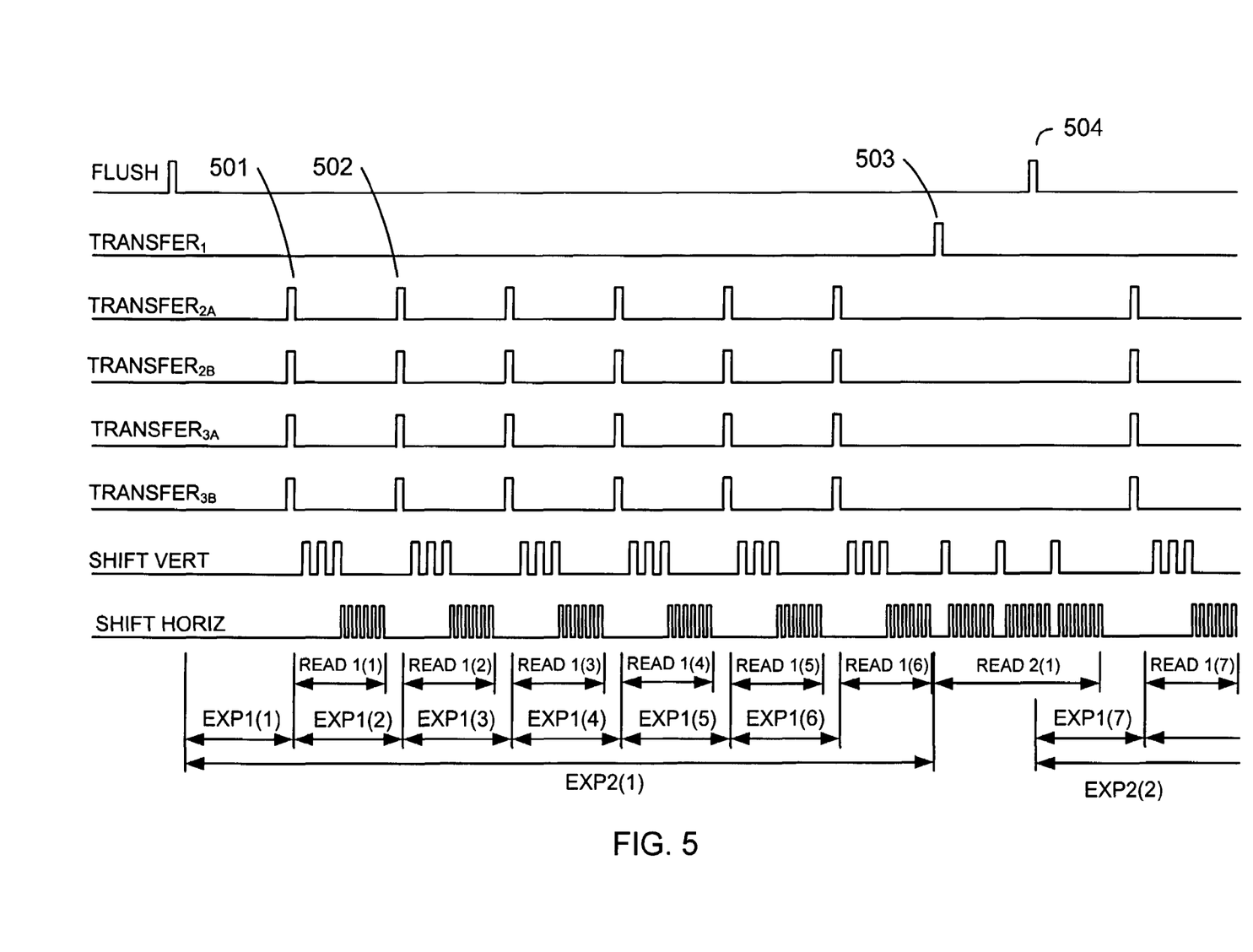
FIG. 5 shows a timing diagram that illustrates how the sensor of FIG. 3 may be controlled in a second example embodiment of the invention.

Many, many other interleaving sequences are possible. FIG. 5 shows a timing diagram that illustrates how sensor 300 may be controlled in a second example embodiment of the invention. The sets of pixels in this example are the same as in the example of FIG. 4. The first set of pixels comprises both fields (2) and (3), and the second set is simply field (1). In the example of FIG. 5, six short-exposure-time photographs are taken for each long-exposure-time photograph using the following control sequence.

First, the FLUSH signal is asserted, emptying the pixels of charge. After a time EXP1, at time 501, charges from pixels in the first set are transferred into vertical shift registers 302 by asserting signals $TRANSFER_{2A}$, $TRANSFER_{2B}$, $TRANSFER_{3A}$, and $TRANSFER_{3B}$. Then the contents of vertical shift registers 302 are shifted into horizontal shift registers 304. In this example, SHIFT VERT is asserted three times without any horizontal shifts in between. This sequence vertically bins the charges from vertical shift registers 302 into horizontal shift registers 304. This is in addition to the vertical binning that occurs when fields (2) and (3) are both transferred into vertical registers 302. Each horizontal shift register therefore holds charge that originated at six different pixels. Horizontal shift registers 304 are then read out using six assertions of SHIFT HORIZ. The resulting digital photograph, derived from the pixels in fields (2) and (3), is therefore taken with the relatively short exposure time EXP1, and includes digital values converted from charges binned from unlike-color pixels. This photograph retains sufficient spatial contrast to evaluate focus quality, but would not be of true color if displayed on display 109.

During the reading out of this first photograph, the pixels in fields (2) and (3) accumulate new charge. After time EXP1 has again elapsed, at time 502, fields (2) and (3) are again read out, resulting in another short-duration photograph. This process is performed six times. Each of the resulting short-exposure-time photographs may be used for automatic focusing.

At time 503, the charges from field (1) are transferred into vertical shift registers 302, and are read out of sensor 300 without any vertical binning. The resulting digital photograph, derived from the pixels in field (1), is therefore taken with the relatively long exposure time EXP2, which is about six times EXP1. No binning of charges from unlike-color pixels has occurred, so this photograph is of accurate color and is suitable for live view display.

In the example of FIG. 5, the camera is readout limited, so the FLUSH signal is asserted at time 504 and the process begins again, resulting in six new short-exposure-time photographs and one long-exposure-time photograph. During horizontal shifting through horizontal shift registers 304, each horizontal shift register 304 contains charge from six pixel sites in the case of the short-exposure-time photographs, and contains charge from only one pixel site in the case of the long-exposure-time photographs. However, because the long exposure time EXP2 is about six times the short exposure time EXP1, the maximum quantity of charge handled (corresponding to bright portions of the scene) is comparable. As long as the exposure times are appropriate for the conditions, saturation is avoided.

Figure 6:
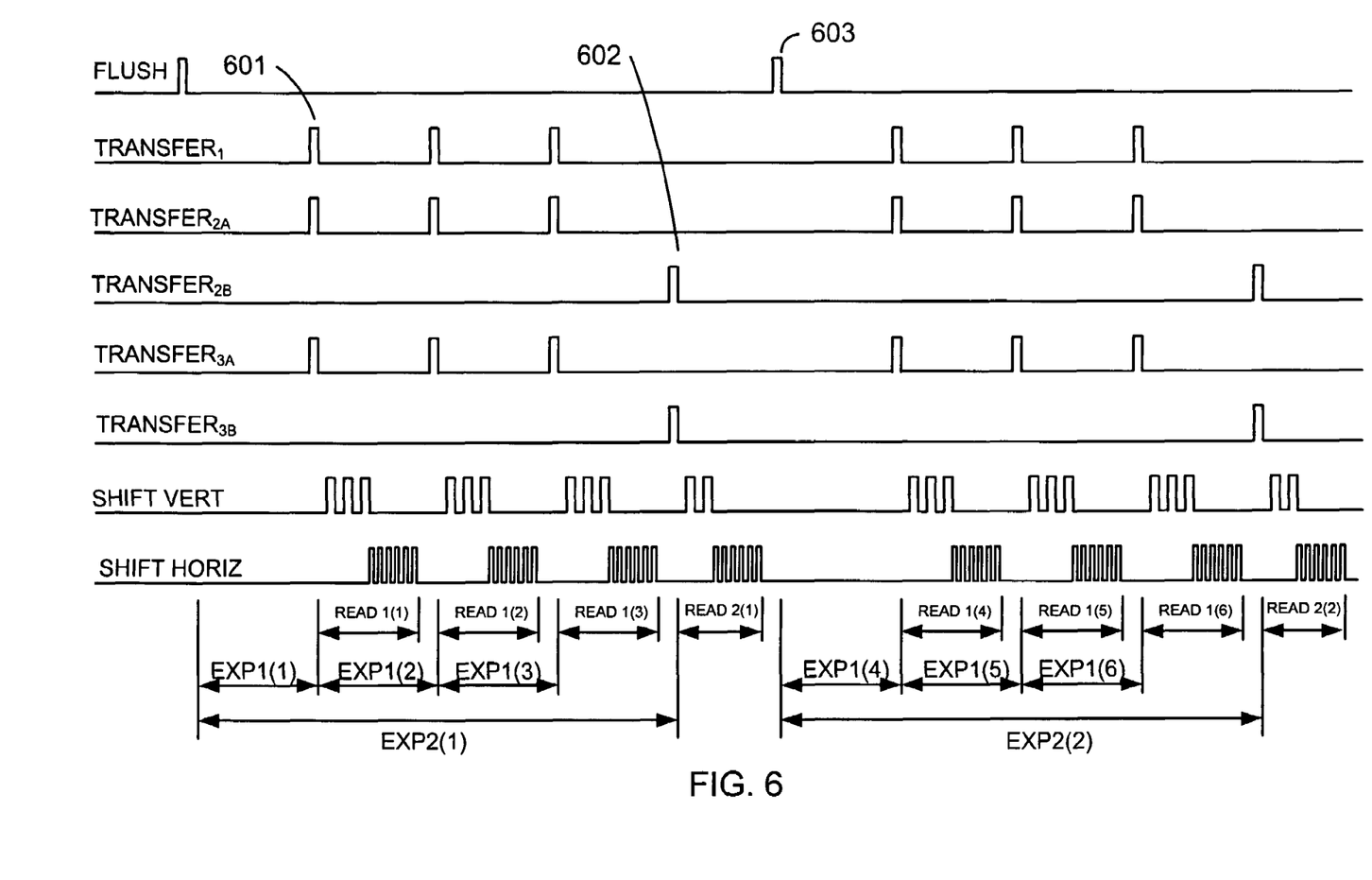
FIG. 6 shows a timing diagram that illustrates how the sensor of FIG. 3 may be controlled in a third example embodiment of the invention.

FIG. 6 shows a timing diagram that illustrates how sensor 300 may be controlled in a third example embodiment of the invention. In this third example embodiment the first set of pixels, used to take photographs with a relatively short exposure time, comprises field (1) and subfields (2A) and (3A). The second set of pixels, used to take photographs with a relatively long exposure time, comprises subfields (2B) and (3B). In this example embodiment, binning of charges from like-color pixels is used in the taking of the long-exposure-time photographs, and binning of charges from unlike-color pixels is used in the taking of the short-exposure-time photographs. The control sequence is as follows.

First, the pixels are flushed of charge. After a time EXP1, at time 601, charges from field (1) and subfields (2A) and (3A) are transferred into vertical shift registers 302 by asserting signals $TRANSFER_1$, $TRANSFER_{2A}$, and $TRANSFER_{3A}$. This transfer causes some vertical binning because the upper rows in subfields (2A) and (3A) share a vertical shift register. The charges are then read out by shifting all three rows of vertical shift registers 302 into horizontal shift registers 304 using three assertions of SHIFT VERT (causing more vertical binning), and then reading out horizontal shift registers 304 using six assertions of SHIFT HORIZ. The resulting digital photograph, derived from the pixels in field (1) and subfields (2A), and (3A), is therefore taken with the relatively short exposure time EXP1, and includes digital values converted from charges binned from unlike-color pixels. This photograph retains sufficient spatial contrast to evaluate focus quality, but would not be of true color if displayed on display 109. Three such photographs are taken while the pixels in subfields (2B) and (3B) continue to accumulate charges.

After three short-exposure-time photographs have been taken, a long-exposure-time photograph is read out of subfields (2B) and (3B). Charges from subfields (2B) and (3B) are transferred into vertical shift registers 302 at time 602 by asserting signals $TRANSFER_{2B}$, and $TRANSFER_{3B}$. These charges are then shifted into horizontal shift registers 304 using two assertions of SHIFT VERT. A third assertion is unnecessary because the top set of vertical shift registers 302 is not used by subfields (2B) and (3B). Even so, these vertical shifts cause vertical binning of charges from only like-color pixels, so that the resulting digital image retains correct colors. Note that in a larger sensor, some rows in subfields (2B) and (3B) will have pixels of blue and green, rather than the red and green, so that the long-exposure-time photograph taken in this step will be of full color and suitable for showing on display 109 as part of a live view sequence. The charges are then read out of horizontal shift registers 304 using six assertions of SHIFT HORIZ. If the system is readout-limited, the FLUSH signal may be asserted again at time 603.

In the example of FIG. 6, the exposures of both sets of pixels are shown as restarting when FLUSH is reasserted at time 603, and the exposure time for the long-exposure-time photographs is slightly longer than three times the exposure time for the short-exposure-time photographs. (In the event that the system were exposure limited and FLUSH were not reasserted, then the exposure time for the long-exposure-time photographs (after the first) could be exactly three times the exposure time for the short-exposure-time photographs, although this is unlikely.) Each charge conversion performed for the long-exposure-time photographs converts charge originating from two pixels, and each charge conversion performed for the short-exposure-time photographs converts charge originating from seven pixels. Therefore the ratio of the number of pixels from which charge is binned in the short-exposure-time and long-exposure-time photographs (7:2) is approximately the same as the ratio of the long exposure time to the short exposure time (about 3:1). Keeping these ratios approximately equal means that the two kinds of photographs use approximately the same portion of the charge carrying capacity of the shift registers. While this is not a requirement, it may be desirable so that the two kinds of images have comparable signal levels and so that the levels can be optimized and saturation avoided.

Preferably, the ratio of the number of pixels from which charge is binned in reading the short-exposure-time and long-exposure-time photographs is between 0.5 and 1.5 times the ratio of the long exposure time to the short exposure time. For the purposes of computing this relationship, reading a photograph without binning (each output stage conversion converts charge originating in only one pixel) will be considered "binning" of one pixel. For example, in the second example embodiment illustrated in FIG. 5, the long-exposure-time photographs are read without binning, while charges from six pixels at a time are binned in reading each short-exposure-time photograph. The long exposure time EXP2 is about six times the short exposure time EXP1. Therefore the ratio of the number of pixels from which charge is binned in the short-exposure-time and long-exposure-time photographs (6:1) is approximately the same as the ratio of the long exposure time to the short exposure time (about 6:1).

Sensor 300 could be partitioned into more than two sets of pixels. For example, one set could comprised field (1), a second set could comprise subfields (2A) and (3A), and a third set could comprise subfields (2B) and (3B). Field one could be read out without binning, subfields (2A) and (3A) could be read out using unlike-color vertical binning of four pixels per conversion, and subfields (2B) and (3B) could be read out using like-color vertical binning of two pixels per conversion. The first set of pixels would preferably be read once for each four readings of the second set of pixels, and the third set would preferably be read once for each two readings of the second set. Other partitionings are possible.

In accordance with a fourth example embodiment of the invention, a digital camera uses a CMOS sensor as its electronic array light sensor rather than a CCD sensor. A CMOS sensor also comprises pixels, each of which accumulates electric charge at a rate proportional to the intensity of light falling on it. However, the way an image is read out of a CMOS sensor differs significantly from the way an image is read out of a CCD sensor. Each pixel of a CMOS sensor also comprises circuitry for generating a voltage that is proportional to the amount of charge collected by the pixel. These voltages can be read directly, without the need to shift the charges across the sensor to an output stage. In some CMOS sensor designs, each pixel is individually addressable. That is, the voltage (indicating the brightness of light falling on the pixel during an exposure time) of any pixel can be read at any time. The reading may be "destructive", in which case the process of reading the pixel voltage empties the pixel of charge, or "nondestructive", in which case the process of reading the pixel voltage does not empty the pixel of charge.

Figure 7:
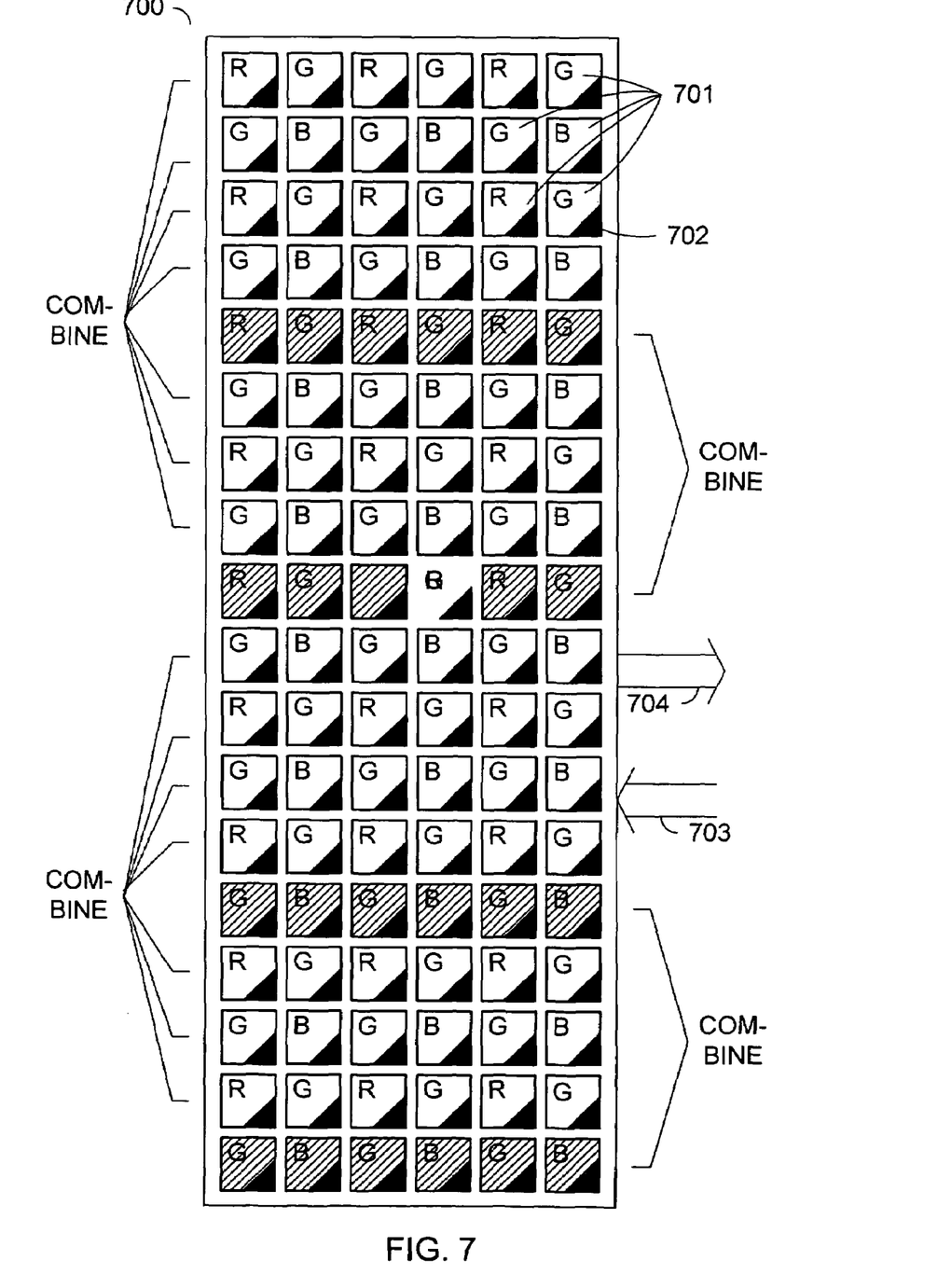
FIG. 7 shows a much simplified schematic diagram of a CMOS sensor and illustrates its use in accordance with an example embodiment of the invention.

FIG. 7 shows a much simplified schematic diagram of a CMOS sensor 700 and illustrates its use in accordance with an example embodiment of the invention. Sensor 700 comprises pixels 701 in 18 rows and six columns. (An actual sensor would have many more pixels.) Pixels 701 further comprise color filters in the familiar Bayer pattern. A portion of each pixel area, exemplified by portion 702, is devoted to circuitry for generating a voltage that is proportional to the amount of charge collected by the pixel. Various control signals 703 control the operation of sensor 700, and various output signals 704 communicate the output of sensor 700 to logic in a camera comprising sensor 700.

Because pixels can be read independently, sensor 700 may easily be operated in a manner similar to the example embodiments described above. Operation similar to the third example embodiment is illustrated in FIG. 7. Sensor 700 may comprise an analog-to-digital converter or one may be supplied externally. Sets of pixels may be read from CMOS sensor 700 and the resulting digital values combined as if they had been generated by shifting and converting charges from a CCD sensor. In this example, the crosshatched pixels in FIG. 7 make up one set of pixels from which one type of image is read, and the non-crosshatched pixels make up a second set of pixels from which a second type of image is read. In operation, sensor 700 is continually exposed to light. Periodically, the non-crosshatched pixels are read. The resulting pixel values may be combined in a manner analogous to vertical binning by simply adding the values of the indicated sets of seven pixels. Such an image combines readings from unlike-color pixels and is taken with a relatively short exposure time. This kind of image is suitable for automatic focus calculations. If the reads are destructive, each pixel is emptied of charge upon each reading and begins accumulating new charge.

After about three short-exposure-time photographs have been taken from the non-crosshatched pixels, a photograph is read from the crosshatched pixels. This photograph has a relatively long exposure time. If values are combined in the indicated like-color sets of two pixels, the image retains its full color nature, and is suitable for live view display. The pixels in a CMOS sensor such as sensor 700 could be partitioned into sets in many other ways.

In another example embodiment of the invention, one of the kinds of interleaved photographs is especially suited for use in setting exposure parameters for the final photograph. In this example embodiment, these special exposure setting photographs are interleaved with photographs suitable for live view. In this way, live view may continue essentially without interruption while exposure parameters for the final photograph are determined. In choosing exposure parameters, it is desirable that the preliminary photograph used to evaluate scene brightness not have any pixels that are saturated. Saturated pixels do not give full information about the brightness of the corresponding scene locations in relation to the brightness of the rest of the scene, and the presence of saturated pixels can result in mis-exposure of the final photograph.

In this example embodiment, one of the kinds of interleaved photographs is taken with a very short exposure time so that no saturation occurs. To accomplish this, one set of pixels, for example field (1), is exposed and read out very quickly so that saturation is avoided. This unsaturated photograph is used for setting exposure parameters for the final photograph. Repeatedly, the pixels in a second set, for example fields (2) and (3), are read and used for a different purpose. If no binning or combining of charges or pixels from unlike-color pixels occurs, these images from the second set of pixels are suitable for live view display.

Figure 8:
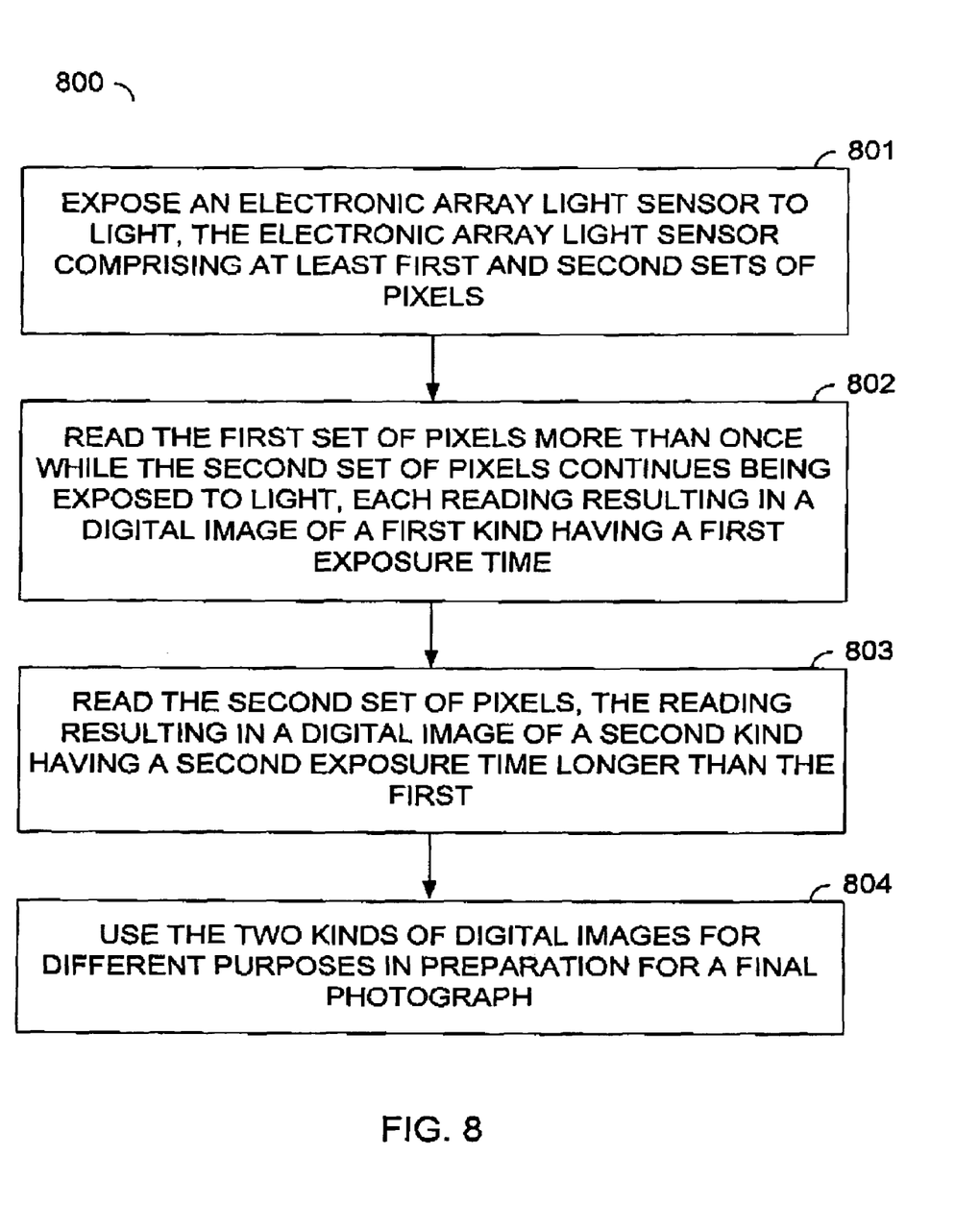
FIG. 8 shows a flowchart of a method in accordance with an example embodiment of the invention.

FIG. 8 shows a flowchart of a method 800 in accordance with an example embodiment of the invention. In step 801, an electronic array light sensor comprising at least first and second sets of pixels is exposed to light. In step 802, the first set of pixels is read more than once while the second set of pixels continues being exposed to light, each reading resulting in a digital image having a first exposure time. In step 803, the second set of pixels is read, resulting in a digital image of a second kind having a second exposure time longer than the first. In step 804, the two kinds of digital images are used for different purposes in preparation for a final photograph.

The invention claimed is:

1. A method of taking interleaved photographs, comprising: exposing an electronic array light sensor to light, the electronic array light sensor comprising at least first and second sets of pixels; reading the first set of pixels more than once while the second set of pixels continues being exposed to the light, each reading resulting in a digital image of a first kind having a first exposure time; reading the second set of pixels, the reading resulting in a digital image of a second kind having a second exposure time longer than the first; and using the two kinds of digital images for different purposes in preparation for a final photograph.

2. The method of claim 1, wherein the images of the first kind are used in automatic focusing of a camera that comprises the electronic array light sensor.

3. The method of claim 1, wherein the image of the second kind is used in a live view display.

4. The method of claim 1, wherein the image of the second kind is used to determine a proper white balance adjustment for the final photograph.

5. The method of claim 1, wherein images of one kind are used to provide a live view display, and an image of the other kind is used in determining exposure settings for the final photograph.

6. The method of claim 5, wherein the exposure time for the image used in determining exposure settings for the final photograph is selected so that saturation is avoided.

7. The method of claim 1, wherein the electronic array light sensor is a charge coupled device sensor, and reading a set of pixels further comprises binning of charges.

8. The method of claim 6, further comprising binning charges from unlike-color pixels.

9. The method of claim 1, wherein the electronic array light sensor is a complementary metal oxide semiconductor sensor, and reading a set of pixels further comprises combining pixel values.

10. The method of claim 9, wherein combining pixel values further comprises adding pixel values from unlike-color pixels.

11. The method of claim 1, further comprising: performing both reading steps and the using step of claim 1 repetitively while the electronic array light sensor is exposed to light; and providing a live view display, using the images having the second exposure time, that continues during automatic focusing.

12. The method of claim 1, wherein reading either set of pixels or both sets of pixels further comprises binning of charges, and wherein the ratio of the number of pixels from which charge is binned in reading the first set of pixels to the number of pixels from which charge is binned in reading the second set of pixels is approximately equal to the ratio of the second exposure time to the first exposure time.

13. The method of claim 12, wherein the ratio of the number of pixels from which charge is binned in reading the first set of pixels to the number of pixels from which charge is binned in reading the second set of pixels is between 0.5 and 1.5 times the ratio of the second exposure time to the first exposure time.

14. The method of claim 1, wherein the electronic array light sensor comprises more than two sets of pixels, and further comprising reading a third set of pixels.

15. A camera, comprising: an electronic array light sensor further comprising at least first and second sets of pixels; a lens that projects an image of a scene onto the electronic array light sensor; and logic, the logic configured to, while the electronic array light sensor is exposed to light from the scene, read more than one short-exposure-time photograph from the first set of pixels while the second set continues being exposed to light; read a long-exposure-time photograph from the second set of pixels; and use the two kinds of photographs for different purposes during preparation for taking a final photograph.

16. The camera of claim 15, wherein the logic is further configured to use the long-exposure-time photograph in a live view display.

17. The camera of claim 15, wherein the logic is further configured to use the short-exposure-time photographs in performing automatic focusing of the lens.

18. The camera of claim 14, wherein the logic is further configured to use photographs of one kind to provide a live view display and to use a photograph of the other kind in selecting exposure settings for the final photograph.

19. The camera of claim 15, wherein the electronic array light sensor is a charge coupled device sensor, and wherein the logic is further configured to bin charges in reading either set of pixels or both sets of pixels, and wherein the ratio of the number of pixels from which charge is binned in reading the first set of pixels to the number of pixels from which charge is binned in reading the second set of pixels is approximately equal to the ratio of the second exposure time to the first exposure time.

20. The camera of claim 19, wherein the ratio of the number of pixels from which charge is binned in reading the first set of pixels to the number of pixels from which charge is binned in reading the second set of pixels is between 0.5 and 1.5 times the ratio of the second exposure time to the first exposure time.

21. The camera of claim 15, wherein the electronic array light sensor is a complementary metal oxide semiconductor sensor, and wherein the logic is further configured to combine pixel values when reading either set of pixels or both sets of pixels.

22. A digital camera, comprising: an electronic array light sensor; a lens that projects an image of a scene onto the electronic array light sensor; and logic, the logic configured to take interleaved photographs of two kinds, the first kind having a first exposure time and being taken using a first set of pixels comprised in the electronic array light sensor and being suitable for evaluating focus of the lens, the second kind having a second exposure time and being taken using a second set of pixels on the electronic array light sensor and being suitable for live view display; and wherein more than one of the kind of photograph having the shorter exposure time is taken during exposure of the kind of photograph having the longer exposure time.

23. The camera of claim 22, further comprising a display, and wherein the logic is further configured to periodically display photographs of the second kind on the display during automatic focusing performed using photographs of the first kind.

* * * * *